United States Patent
Lee et al.

(10) Patent No.: US 7,341,980 B2
(45) Date of Patent: *Mar. 11, 2008

(54) VISCOELASTIC SURFACTANT RHEOLOGY MODIFICATION

(75) Inventors: Jesse Lee, Sugar Land, TX (US); Yiyan Chen, Richmond, TX (US); Timothy Pope, Sugar Land, TX (US); Eric Hanson, San Diego, CA (US); Samuel Cozzens, Rock Springs, WY (US); Taner Batmaz, Rock Springs, WY (US)

(73) Assignee: Schlumberger Technology Corporation, Sugar Land, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 10/994,664

(22) Filed: Nov. 22, 2004

(65) Prior Publication Data

US 2006/0111248 A1     May 25, 2006

(51) Int. Cl.
*C09K 8/584* (2006.01)
*C09K 8/588* (2006.01)
*E21B 21/00* (2006.01)

(52) U.S. Cl. .................. 507/261; 507/260; 507/266; 507/267; 166/308.2

(58) Field of Classification Search ............. 507/261, 507/265, 266
See application file for complete search history.

(56) References Cited

U.S. PATENT DOCUMENTS

| | | | | |
|---|---|---|---|---|
| 5,964,295 | A | 10/1999 | Brown et al. | 166/308 |
| 6,194,356 | B1 | 2/2001 | Jones et al. | 507/225 |
| 6,258,859 | B1 | 7/2001 | Dahayanake et al. | 516/77 |
| 6,306,800 | B1 | 10/2001 | Samuel et al. | 507/129 |
| 6,435,277 | B1 * | 8/2002 | Qu et al. | 166/281 |
| 6,605,570 | B2 | 8/2003 | Miller et al. | 507/211 |
| 6,637,517 | B2 * | 10/2003 | Samuel et al. | 166/381 |

(Continued)

FOREIGN PATENT DOCUMENTS

EP     495 579 A2 *    7/1992

(Continued)

OTHER PUBLICATIONS

U.S. Appl. No. 11/012,446, filed Dec. 15, 2004 titled, "Viscoelastic Surfactant Rheology Modification".

*Primary Examiner*—Randy Gulakowski
*Assistant Examiner*—John J. Figueroa
(74) *Attorney, Agent, or Firm*—Darla Fonseca; David Cate; Robin Nava

(57) ABSTRACT

A method for shortening the shear recovery time of zwitterionic viscoelastic surfactant fluids by adding a rheology enhancer having the structure:

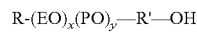

$R\text{-}(EO)_x(PO)_y\text{-}R'\text{-}OH$ in which R is an alkyl group that is straight chained or branched, saturated or unsaturated, and contains from 3 to about 18 carbon atoms, x is from 0 to about 14, y is from 0 to about 7, R' is an alkyl group that contains from 0 to about 14 carbon atoms and is straight chained, branched if having more than 3 carbon atoms, saturated, unsaturated if having more than one carbon atom, the total number of carbon atoms in R plus R' is from 3 to about 21, and the EO and PO groups, if present, may be in any order. The rheology enhancer also increases fluid viscosity and thermal stability. Preferred surfactants are betaines. The fluids are useful in oilfield treatments, for example fracturing and gravel packing.

13 Claims, 3 Drawing Sheets

U.S. PATENT DOCUMENTS

| | | | |
|---|---|---|---|
| 6,767,869 B2 | 7/2004 | DiLullo et al. | 507/244 |
| 6,881,709 B2 * | 4/2005 | Nelson et al. | 507/203 |
| 6,903,054 B2 * | 6/2005 | Fu et al. | 507/244 |
| 6,904,972 B2 * | 6/2005 | Zhang et al. | 166/283 |
| 6,908,888 B2 * | 6/2005 | Lee et al. | 507/219 |
| 6,929,070 B2 * | 8/2005 | Fu et al. | 166/308.2 |
| 6,978,838 B2 * | 12/2005 | Parlar et al. | 166/311 |
| 7,036,589 B2 * | 5/2006 | Nguyen | 166/280.1 |
| 7,084,095 B2 * | 8/2006 | Lee et al. | 507/261 |
| 7,148,184 B2 * | 12/2006 | Francini et al. | 507/241 |
| 2002/0004464 A1 | 1/2002 | Nelson et al. | 507/200 |
| 2002/0193257 A1 | 12/2002 | Lee et al. | 507/200 |
| 2003/0104950 A1 * | 6/2003 | Frenier et al. | 507/200 |
| 2003/0119680 A1 * | 6/2003 | Chang et al. | 507/200 |
| 2003/0134751 A1 | 7/2003 | Lee et al. | 507/200 |
| 2003/0236174 A1 | 12/2003 | Fu et al. | 507/200 |
| 2004/0063587 A1 | 4/2004 | Horton et al. | 507/100 |
| 2005/0155762 A1 * | 7/2005 | Chen et al. | 166/281 |
| 2006/0025321 A1 * | 2/2006 | Treybig et al. | 510/382 |
| 2006/0105919 A1 * | 5/2006 | Colaco et al. | 507/209 |
| 2006/0131017 A1 * | 6/2006 | Garcia-Lopez De Victoria et al. ................................................ 166/282 |
| 2006/0185842 A1 * | 8/2006 | Chen et al. | 166/170 |
| 2006/0276347 A1 * | 12/2006 | Lin et al. | 507/209 |

FOREIGN PATENT DOCUMENTS

| | | |
|---|---|---|
| WO | WO 98/56497 A1 * | 12/1998 |
| WO | WO 99/32572 A1 * | 7/1999 |
| WO | 03097995 A1 | 11/2003 |

* cited by examiner

VISCOELASTIC SURFACTANT RHEOLOGY MODIFICATION

BACKGROUND OF THE INVENTION

The invention relates to rheology enhancers for viscoelastic surfactant fluid systems (VES's). More particularly it relates to selection and optimization of rheology enhancers for fluid systems to be used over broad ranges of salinity and temperature. Most particularly it relates to rheology enhancers to increase stability and shorten shear recovery times of VES's for use in oilfield treatment fluids.

Certain surfactants, when in aqueous solution, form viscoelastic fluids. Such surfactants are termed "viscoelastic surfactants", or "VES's". Not to be limited by theory, but many viscoelastic surfactant systems form long rod-like or worm-like micelles in aqueous solution. Entanglement of these micelle structures gives viscosity and elasticity to the fluid. For a fluid to have good viscosity and elasticity under given conditions, proper micelles must be formed and proper entanglement is needed. This requires the surfactant's structure to satisfy certain geometric requirements and the micelles to have sufficient length or interconnections for adequate entanglements. VES fluid systems may contain many additives, such as but not limited to co-surfactants and salts, that perform such functions as increasing the stability (especially thermal stability) or increasing the viscosity of the systems by modifying and/or stabilizing the micelles.

Many chemical additives are known to improve the rheological behavior (greater viscosity and/or greater stability and/or greater brine tolerance and/or lower shear sensitivity and/or faster rehealing if micelles are disrupted, for example by shear). Such materials are typically called co-surfactants, rheology modifiers, or rheology enhancers, etc., and typically are alcohols, organic acids such as carboxylic acids and sufonic acids, sulfonates, and others. We shall use the term rheology enhancers here. Such materials often have different effects, depending upon their exact composition and concentration, relative to the exact surfactant composition (for example hydrocarbon chain lengths of groups in the surfactant and co-surfactant) and concentration. For example, such materials may be beneficial at some concentrations and harmful (lower viscosity, reduced stability, greater shear sensitivity, longer rehealing times) at others.

In particular, many VES fluid systems exhibit long viscosity recovery times after experiencing prolonged high shear. Slow recovery negatively impacts drag reduction and proppant transport capability, which consequently lead to undesirably high treating pressures and risks of near wellbore screen-outs. Although additives are known that can shorten VES shear recovery times and increase viscosity stabilities, there is a need for additional simple, inexpensive rheology enhancers.

SUMMARY OF THE INVENTION

A first embodiment of the invention is an oilfield treatment method including providing a fluid viscosified with a viscoelastic surfactant and a rheology enhancer in a concentration sufficient to shorten the shear recovery time of the fluid. The rheology enhancer contains a compound or mixture of compounds having the structure:

$$R\text{-}(EO)_x(PO)_y\text{-}R'\text{-}OH$$

in which R is an alkyl group that is straight chained or branched, saturated or unsaturated, and contains from 3 to about 18 carbon atoms, x is from 0 to about 14, y is from 0 to about 7, R' is an alkyl group that contains from 0 to about 14 carbon atoms and is straight chained, branched if having more than 3 carbon atoms, saturated, unsaturated if having more than one carbon atom, the total number of carbon atoms in R plus R' is from 3 to about 21, and the EO and PO groups, if present, may be in any order. The fluid and rheology enhancer are then injected down a well. The rheology enhancer may also increase the viscosity and/or thermal stability of the fluid. The viscoelastic surfactant is, for example, a zwitterionic surfactant, for example a zwitterionic surfactant or mixture of zwitterionic surfactants having the formula:

$$RCONH\text{—}(CH_2)_a(CH_2CH_2O)_m(CH_2)_b\text{—}N^+(CH_3)_2\text{—}(CH_2)_{a'}(CH_2CH_2O)_{m'}(CH_2)_{b'}COO^-$$

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$. A suitable example of such zwitterionic surfactants is a betaine, for example erucylamidopropyl betaine. The rheology enhancer is present in the fluid at a concentration of from about 0.1 to about 6%. Examples of the rheology enhancer are isopropyl alcohol, ethylene glycol monobutyl ether, n-butanol, dipropylene glycol methyl ether, and mixtures of these. Another example is a mixture of n-butanol, ethylene glycol monobutyl ether, mixed C11 alcohol ethoxylates, and undecanol.

Another embodiment is a method of shortening the shear recovery time of viscoelastic surfactant fluid systems made with surfactants as described in the preceding paragraph by adding rheology enhancers as described in the preceding paragraph.

DETAILED DESCRIPTION OF THE INVENTION

Figure 1:
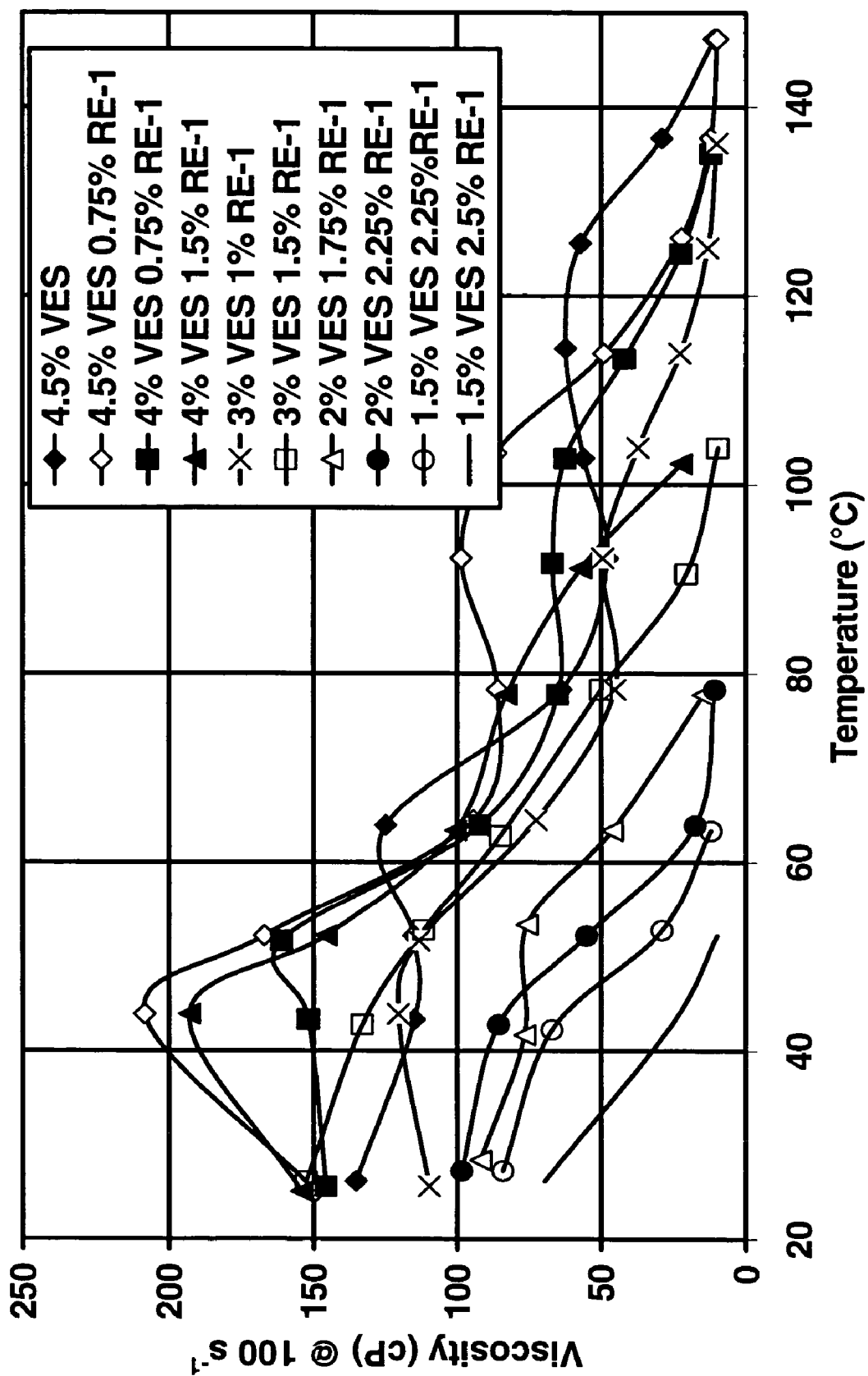
FIG. 1 shows viscosity as a function of temperature of fluids having various concentrations of a viscoelastic surfactant and various concentrations of a rheology enhancer of the invention.

When fluids are viscosified by the addition of viscoelastic surfactant systems, the viscosity increase is believed to be due to the formation of micelles, for example worm-like micelles, which entangle to give structure to the fluid that leads to the viscosity. In addition to the viscosity itself, an important aspect of a fluid's properties is the degree of viscosity-recovery or re-healing when the fluid is subjected to high shear and the shear is then reduced. For VES fluids, shear may disrupt the micelle structure, after which the structure reforms. Controlling the degree of reassembling (re-healing) is necessary to maximize performance of the surfactant system for different applications. For example, in hydraulic fracturing it is critical for the fluid to regain viscosity as quickly as possible after exiting the high-shear region in the tubulars and entering the low-shear environment in the hydraulic fracture. On the other hand, it is beneficial in coiled tubing cleanouts to impart a slight delay in regaining full viscosity in order to "jet" the solids more efficiently from the bottom of the wellbore into the annulus. Once in the annulus the regained viscosity ensures that the solids are effectively transported to the surface. Controlling the viscosity-recovery and the time required for such recovery is therefore desirable.

Although betaine based viscoelastic surfactant fluid systems have been shown to have excellent rheological properties for hydraulic fracturing applications, shear recovery time, not fluid viscosity, often dictates the minimum concentration of surfactant required. For example, a fluid made with a certain concentration of surfactant may show adequate viscosity for fracturing at a given temperature, but the minimum usable concentration may be higher due to slow shear recovery with the lower concentration. An acceptable shear recovery time is considered to be 15 seconds. A time longer than 15 seconds will negatively impact drag reduction and proppant transport.

We have found that certain simple additives, when included in certain viscoelastic surfactant fluid systems (such as zwitterionic surfactant fluid systems, especially betaine surfactant fluid systems) in the proper concentration relative to the surfactant active ingredient, significantly shorten the shear recovery time of the systems, sometimes while increasing the viscosity and/or micelle thermal stability at the same time. Some of these additives have been included in VES systems before, but not for this purpose and so although appropriate concentrations and ratios may have been used by chance, the improvement was not recognized and so a) using these materials in a method for improving fluid rheological properties and b) improving methods using the fluids was not achieved. Furthermore, since the method was not known, the concentrations and ratios could not be, and were not, purposely optimized for rheology enhancement. For example, small amounts of some suitable additives have in the past been added to commercial concentrates of surfactants, including VES surfactants, in order to help solubilize the surfactant, or to lower the concentrates' freezing points, or to prevent foaming when the fluids are made from the concentrates (see, for example U.S. Pat. No. 6,258,859). In fact, the VES concentrates used to prepare the VES fluids used in the experiments described below contained about 60% as much isopropanol as active surfactant. On the other hand, some of the suitable additives have been reported to be viscosity reducers, or even breakers, for VES surfactants; see for example U.S. Patent Application Publication No. 2002-0004464. Isopropyl alcohol has been reported (U.S. Patent Application Publication No. 2003-0236174 to contribute to stabilization of micelles of zwitterionic surfactants in a salt or mixture of salts of a divalent cation or mixture of divalent cations forming a brine having a density above about 1.5 kg/L (about 12.5 ppg).

We have found new classes of chemical additives that are effective for shortening the rehealing time after high shear, increasing the viscosity of VES systems at a given temperature, and/or increasing the temperature at which such VES systems maintain viscosities that make the fluids useful for many purposes, such as, but not limited to, uses as oilfield treatment fluids, especially stimulation fluids, most especially hydraulic fracturing fluids. We will call these materials "rheology enhancers" here. The rheology enhancers extend the conditions under which the VES systems can be used, and reduce the amount of surfactant needed, which in turn reduces the cost and improves clean-up.

The rheology enhancers of the invention have the structure:

in which R is an alkyl group that is straight chained or branched, saturated or unsaturated, and contains from 3 to about 18 carbon atoms, x is from 0 to about 14, y is from 0 to about 7, R' is an alkyl group that contains from 0 to about 14 carbon atoms and is straight chained, branched if having more than 3 carbon atoms, saturated, unsaturated if having more than one carbon atom, the total number of carbon atoms in R plus R' is from 3 to about 21, and the EO (ethylene oxide) and PO (propylene oxide) groups, if present, may be in any order.

The rheology enhancers of the present invention give the desired results with any zwitterionic VES system. However, they have been found to be particularly effective with certain zwitterionic surfactants. In general, particularly suitable zwitterionic surfactants have the formula:

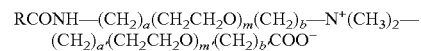

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$.

Preferred surfactants are betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. VES systems, in particular BET-E-40, optionally contain about 1% of a condensation product of a naphthalene sulfonic acid, for example sodium polynaphthalene sulfonate, as a rheology modifier, as described in U.S. Patent Application Publication No. 2003-0134751. The surfactant in BET-E-40 is also shown below; one chemical name is erucylamidopropyl betaine. As-received concentrates of BET-E-40 were used in the experiments reported below, where they will be referred to as "VES" and "VES-1". BET surfactants, and other VES's that are suitable for the present Invention, are described in U.S. Pat. No. 6,258,859. According to that patent, BET surfactants make viscoelastic gels when in the presence of certain organic acids, organic acid salts, or inorganic salts; the inorganic salts may be present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants for BET-O-

30 are certain chelating agents such as trisodium hydroxyethylethylenediamine triacetate.

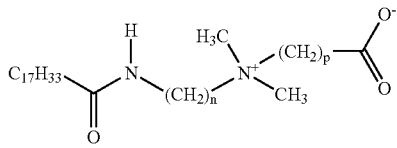

Surfactant in BET-O-30 (when n=3 and p=1)

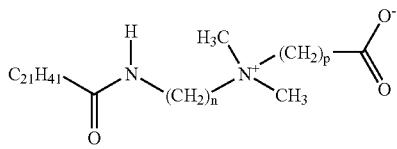

Surfactant in BET-E-40 (when n=3 and p=1)

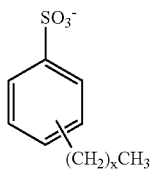

SDBS (when x=11 and the counterion is Na$^+$)

Preferred embodiments of the present invention use betaines; most preferred embodiments use BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. More preferred betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. The surfactants are used at a concentration of about 0.5 to about 10%, preferably from about 1 to about 5%, and most preferably from about 1.5 to about 4.5%.

Although the surfactant embodiments of the invention are preferably used without co-surfactants, they may be used with co-surfactants, for example those having the SDBS-like structure in which x=5-15; preferred co-surfactants are those in which x=7-15.

Preparation and use (mixing, storing, pumping, etc.) of the improved VES fluids of the invention are the same as for such fluids without the rheology enhancers of the invention. For example, the order of mixing is not affected by including these rheology enhancers. Optionally, the rheology enhancers may be incorporated in surfactant concentrates (provided that they do not affect component solubilities or concentrate freezing points) so that the concentrates can be diluted with an aqueous fluid to make VES systems. This maintains the operational simplicity of the VES systems. As is normally the case in fluid formulation, laboratory tests should be run to ensure that the additives do not affect, and are not affected by, other components in the fluid (such as salts, for example). In particular, the rheology enhancers of the present invention may be used with other rheology modifiers. Adjusting the concentrations of surfactant, rheology enhancer, and other fluid components to account for the effects of other components is within the scope of the invention.

The fluid may be used, for example in oilfield treatments. As examples, the fluid may be used as a pad fluid and as a carrier fluid in hydraulic fracturing, as a carrier fluid for lost circulation control agents, and as a carrier fluid for gravel packing. The fluids may also be used in other industries, such as pharmaceuticals, cosmetics, printing, and agriculture.

The optimal concentration of a given rheology enhancing additive of the invention for a given choice of VES surfactant fluid system at a given concentration and temperature, and with given other materials present, can be determined by simple experiments. The total viscoelastic surfactant concentration must be sufficient to form a viscoelastic gel under conditions at which the surfactants have sufficient aggregation tendency. The appropriate amounts of surfactant and rheology enhancer are those necessary to achieve the desired viscosity and shear recovery time as determined by experiment. Again, tolerance for, and optimal amounts of other additives may also be determined by simple experiment. In general, the amount of surfactant (as active ingredient) is from about 1 to about 10%. Commercially available surfactant concentrates may contain some materials that we have found may be used as rheology enhancers, for example for concentrate freezing point depression, but normally the amount of such material is not sufficient, when the concentrate is diluted, in the final fluid. The amount of rheology enhancer used, in addition to any that may be already present in the as-received surfactant concentrate, is from about 0.1 to about 6%, for example from about 0.25 to about 3.5%, most particularly from about 0.25 to about 1.75%. Mixtures of surfactants and/or mixtures of rheology enhancers may be used.

The present invention can be further understood from the following examples. In the preceding discussion, the term "VES" has been used generically. In the following experimental section, when we refer to "VES" we mean a concentrate that was received as about 23% isopropanol, about 5% sodium chloride, about 32% water, about 1% sodium polynaphthalene sulfonate, and about 39% erucic amidopropyl dimethyl betaine. When we refer to "VES-1" we mean the same concentrate except without the sodium polynaphthalene sulfonate. When we refer to a certain percent VES or VES-1, we mean that percent of this as-received concentrate.

EXAMPLE 1

This example (FIG. 1) describes the effect, on the viscosity as a function of temperature, of the addition of varying concentrations of ethylene glycol monobutyl ether, designated RE-1 (for "rheology enhancer one") to fluids made with varying concentrations of VES. It can be seen that without RE-1, a fluid made with 4.5% VES is useful only up to a temperature of about 90° C. (We define useful here as having little chance of the viscosity falling below about 50 cP.) Remember that 4.5% VES is equivalent to about 1.8% betaine surfactant active ingredient. Only 0.75% RE-1 extends the useful temperature range of 4.5% VES by about 15° C. Addition of more RE-1 can make even lower concentrations of VES useful at elevated temperatures.

EXAMPLE 2

Figure 2:
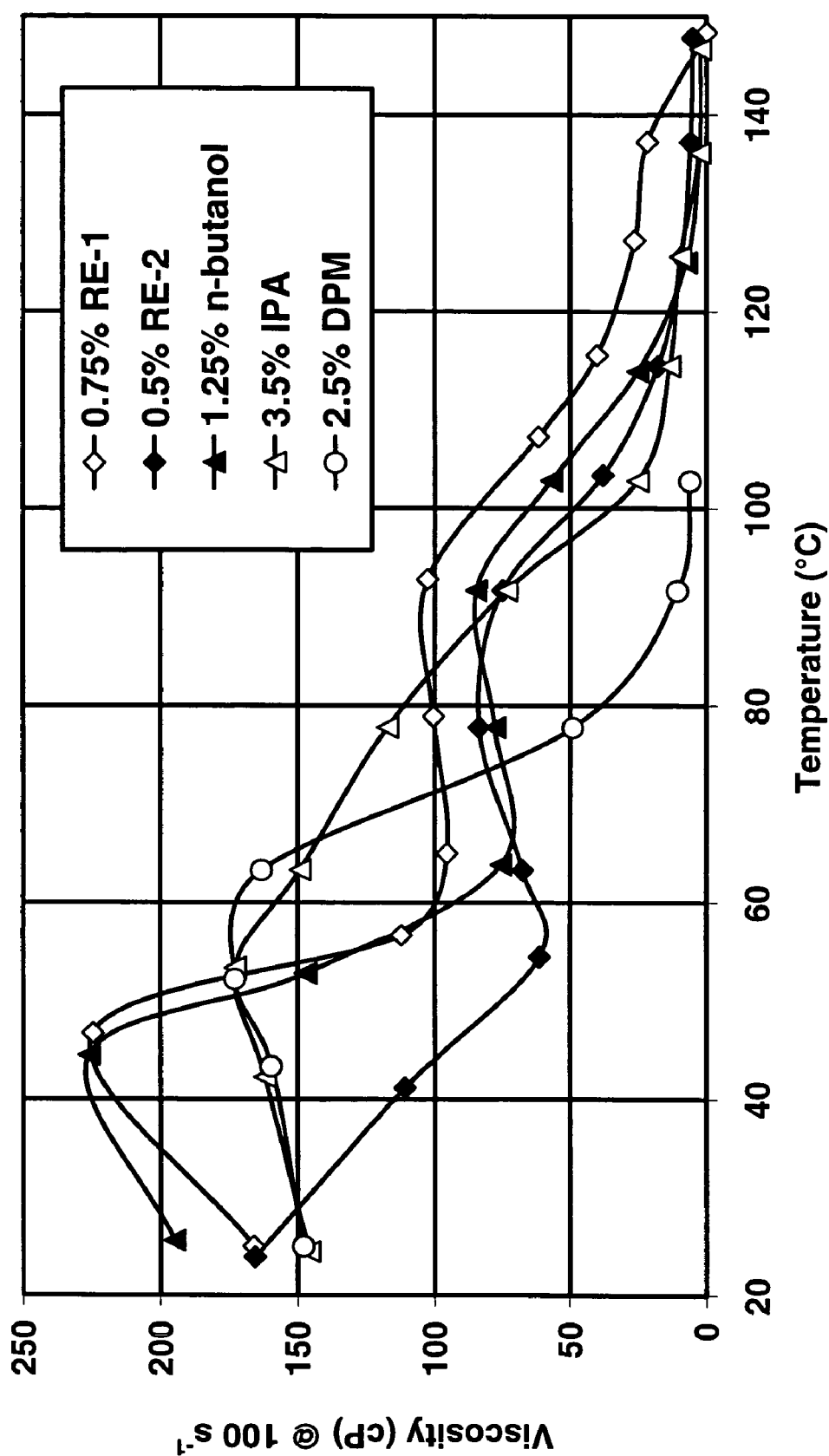
FIG. 2 shows viscosity as a function of temperature of fluids containing a viscoelastic surfactant and various rheology enhancers of the invention.

FIG. 2 compares the effect of the addition of various other suitable rheology enhancers to 4.5% VES (about 1.8% betaine surfactant active ingredient). It can be seen that addition of 0.5% RE-2 is almost as effective as 0.75% RE-1, at increasing the useful temperature range. (RE-2 is a mixture of about 10% n-butanol, about 25% ethylene glycol monobutyl ether, about 15% water, about 48% mixed C11 alcohol ethoxylates, and about 2% undecanol.) Also effective are n-butanol and IPA (isopropyl alcohol). 2.5% DPM (dipropylene glycol methyl ether) did not increase the useful temperature range of 4.5% VES.

EXAMPLE 3

Figure 3:
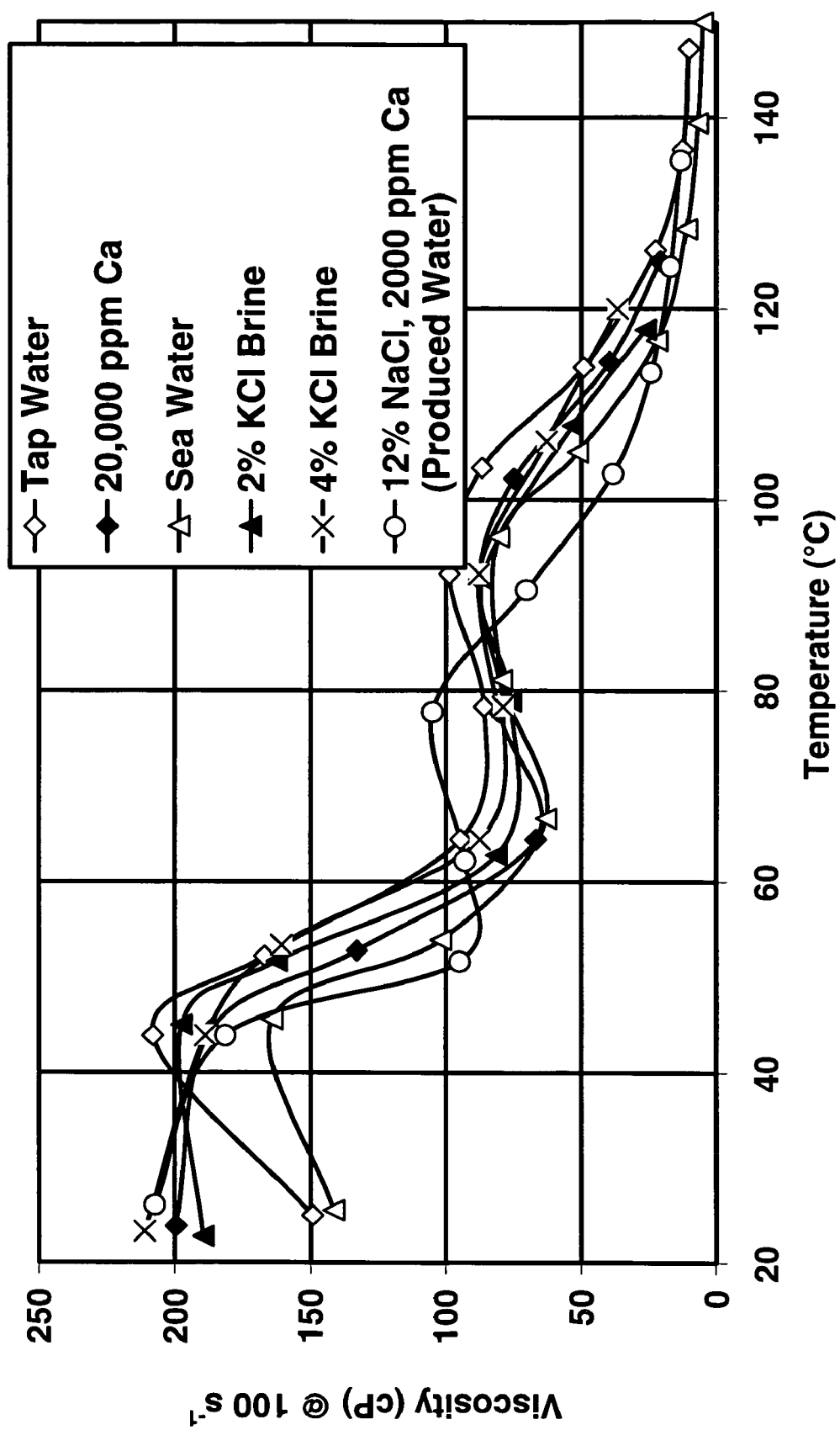
FIG. 3 shows viscosity as a function of temperature of fluids containing a viscoelastic surfactant, a rheology enhancer of the invention, and various salts.

FIG. 3 shows the improvement in the useful temperature range of a fluid made with 4.5% VES and 0.75% RE-1 in various brines. It can be seen that the brines had very little effect. It is believed that such a small deleterious effect of brine may be offset by an increase in the rheology enhancer concentration.

EXAMPLE 4

Table 1 shows the shear recovery times observed when various amounts of RE-1 were added to various amounts of VES. In these experiments, approximately 200 mL of already-mixed VES fluid was sheared at no less than 10,000 rpm for no less than 30 seconds and no more than 1 minute in a 1 L Waring blender. The shearing was stopped and timing was begun. The fluid was poured back and forth between a beaker and the blender cup and the fluid recovery was characterized by two times, referred to as the initial and final recovery times; both were estimated by visual observation. The initial fluid recovery time was the time at which fluid "balling" occurred (when the fluid showed the first signs of elasticity as indicated by the fluid taking a longer time to achieve a flat surface in the receiving beaker when poured). The final fluid recovery time was the time at which fluid "lipping" occurred. The fluid "lips" when inclining the upper beaker or cup containing the fluid does not result in fluid flow into the container below, but rather the formation of a "lip", and pulling the container back to a vertical position pulls back the "lip". In fracturing fluid practice, "lipping" is used to estimate when the fluid reaches its near-equilibrium elasticity.

TABLE 1

| Concentration | | Shear Recovery Time (sec) | |
|---|---|---|---|
| VES | RE-1 | Initial | Final |
| 5% | 0% | 30 | 58 |
|  | 0.25% | 15 | 29 |
|  | 0.50% | 7 | 12 |
|  | 0.75% | 0 | 4 |
|  | 1.00% | 0 | 1 |
| 4.5% | 0% | 40 | 85 |
|  | 0.25% | 20 | 40 |
|  | 0.50% | 10 | 18 |
|  | 0.75% | 2 | 8 |
|  | 1.00% | 0 | 1 |
| 4% | 0 | 60 | 150 |
|  | 0.25% | 30 | 80 |

TABLE 1-continued

| Concentration | | Shear Recovery Time (sec) | |
|---|---|---|---|
| VES | RE-1 | Initial | Final |
|  | 0.50% | 25 | 40 |
|  | 0.75% | 7 | 14 |
|  | 1.00% | 2 | 4 |
| 3% | 0% | 150 | 360 |
|  | 0.25% | 75 | 165 |
|  | 0.50% | 30 | 80 |
|  | 0.75% | 12 | 32 |
|  | 1.00% | 7 | 14 |
|  | 1.25% | 3 | 6 |
| 2% | 0% | 1200 | 2640 |
|  | 1.00% | 90 | 165 |
|  | 1.25% | 40 | 85 |
|  | 1.50% | 17 | 35 |
|  | 1.75% | 6 | 13 |
|  | 2.00% | 1 | 1 |

It can be seen that the amount of RE-1 needed to lower the shear time to an acceptable level (considered here to be 15 seconds) increased with decreasing amounts of VES. However, with shear recovery time as the criterion, although a 5% VES fluid could not pass this test without a rheology enhancer, even a 2% VES fluid could pass the test with less than 1.75% RE-1 added.

EXAMPLE 5

Using the same test as in Example 4, several other shear recovery enhancers of the invention were evaluated at several concentrations in 4.5% VES. As shown in Table 2, all of them reduced the shear recovery times to less than 15 seconds at all concentrations tested.

TABLE 2

| Additive | Amount | Shear Recovery Time (sec) | |
|---|---|---|---|
|  |  | Initial | Final |
| RE-2 | 0.50% | 0 | 0 |
|  | 0.75% | 0 | 0 |
| n-BuOH | 0.75% | 7 | 12 |
|  | 1.25% | 0 | 0 |
| IPA | 2.50% | 8 | 14 |
|  | 3.50% | 5 | 8 |
| DPM | 2.25% | 6 | 14 |
|  | 2.50% | 5 | 9 |

EXAMPLE 6

The effect of using a different viscoelastic surfactant concentrate was tested with the same procedure as Examples 4 and 5. The results are shown in Table 3.

TABLE 3

| Concentration | | Shear Recovery Time (sec) | |
|---|---|---|---|
|  |  | Initial | Final |
| 4.5% VES | RE-1 |  |  |
|  | 0% | 40 | 85 |
|  | 0.25% | 20 | 40 |
|  | 0.50% | 10 | 18 |
|  | 0.75% | 2 | 8 |
|  | 1.00% | 0 | 1 |
| 4.5% | 0% | >300 | >300 |

TABLE 3-continued

| | | Shear Recovery Time (sec) | |
|---|---|---|---|
| | Concentration | Initial | Final |
| VES-1 | 0.25% | 80 | 260 |
| | 0.50% | 22 | 55 |
| | 0.75% | 12 | 34 |
| | 1.00% | 4 | 9 |

It can be seen that with VES-1 (VES without 1% of the rheology modifier sodium polynaphthalene sulfonate in the concentrate) more RE-1 was required to obtain the same reduction in shear recovery time. Conversely, the two additives work in conjunction with one another and each works in the presence of the other.

We claim:

1. An oilfield treatment method comprising
   a. providing a fluid viscosified with a betaine zwitterionic viscoelastic surfactant and a rheology enhancer, said viscosified fluid having a micelle structure, wherein said fluid has a rheology comprising a viscosity recovery time at relatively low shear conditions following a reduced viscosity from high shear conditions,
      said rheology enhancer present in the fluid at a concentration of from about 0.1% to about 3.5%, sufficient to shorten the viscosity recovery time of the viscoelastic surfactant system to fifteen seconds or less, said rheology enhancer comprising a compound or mixture of compounds selected from the group consisting of ethylene glycol monobutyl ether, dipropylene glycol methyl ether, and mixtures thereof, and
   c. injecting said fluid down a well.

2. The method of claim 1 further wherein said rheology enhancer increases the viscosity of said fluid.

3. The method of claim 1 further wherein said rheology enhancer increases the thermal stability of said fluid.

4. The method of claim 3 wherein said zwitterionic surfactant comprises a surfactant or mixture of surfactants having the formula:

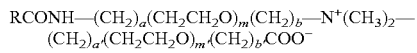

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 1 to 14; and $CH_2CH_2O$ may also be $OCH_2CH_2$.

5. The method of claim 1 wherein said betaine is erucylamidopropyl betaine.

6. The method of claim 1 wherein said rheology enhancer comprises ethylene glycol monobutyl ether.

7. An oilfield treatment method comprising
   a. providing a fluid viscosified with a betaine zwitterionic viscoelastic surfactant, and a rheology modifier, said fluid having a micelle structure, wherein said fluid has a rheology comprising a viscosity recovery time at relatively low shear conditions following a reduced viscosity from high shear conditions, said rheology enhancer present at a concentration of
      from about 0.1% to about 3.5% in the fluid to shorten the shear recovery time of said fluid, said rheology enhancer comprising a compound or mixture of compounds selected from the group consisting of ethylene glycol monobutyl ether, dipropylene glycol methyl ether, and mixtures thereof and
   b. injecting said fluid down a well,
wherein said fluid returns to its micelle structure in fifteen seconds or less.

8. An oilfield treatment method according to claim 7 wherein said rheology enhancer is present in said fluid at a concentration of from about 0.25 to about 3.5% of said fluid.

9. An oilfield treatment method according to claim 7 wherein said rheology enhancer is present in said fluid in a concentration of from about 0.25 to about 1.75% of said fluid.

10. An oilfield treatment method according to claim 7 wherein said rheology enhancer further comprises undecanol.

11. An oilfield treatment method according to claim 7 wherein said zwitterionic surfactant comprises a surfactant or mixture of surfactants having the formula:

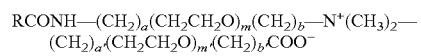

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 1 to 14; and $CH_2CH_2O$ may also be $OCH_2CH_2$.

12. An oilfield treatment method according to claim 7 wherein said betaine is erucylamidopropyl betaine.

13. An oilfield treatment method according to claim 7 wherein said rheology enhancer comprises ethylene glycol monobutyl ether.

* * * * *